(12) United States Patent
Zhou et al.

(10) Patent No.: US 10,775,069 B2
(45) Date of Patent: *Sep. 15, 2020

(54) HVAC SYSTEM AND CORRESPONDING METHODS OF CONTROLLING HVAC FAN AND COIL CAPACITY

(71) Applicant: TRANE INTERNATIONAL INC., Davidson, NC (US)

(72) Inventors: John Zhou, Onalaska, WI (US); Thomas J. Clanin, La Crescent, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,390

(22) Filed: Feb. 4, 2019

(65) Prior Publication Data
US 2019/0242609 A1    Aug. 8, 2019

Related U.S. Application Data

(63) Continuation of application No. 15/594,893, filed on May 15, 2017, now Pat. No. 10,197,300, which is a
(Continued)

(51) Int. Cl.
*F24F 11/76* (2018.01)
*F28F 27/00* (2006.01)
(Continued)

(52) U.S. Cl.
CPC .............. *F24F 11/76* (2018.01); *F24F 11/30* (2018.01); *F24F 11/77* (2018.01); *F24F 11/83* (2018.01);
(Continued)

(58) Field of Classification Search
CPC combination set(s) only.
See application file for complete search history.

(56) References Cited

U.S. PATENT DOCUMENTS 4,353,409 A    10/1982    Saunders et al.
4,543,796 A    10/1985    Han et al.
(Continued)

*Primary Examiner* — Ljiljana V. Ciric
(74) *Attorney, Agent, or Firm* — Hamre, Schumann, Mueller & Larson, P.C.

(57) ABSTRACT

A heating, ventilation, and air conditioning ("HVAC") system and a method for controlling the HVAC system. The HVAC system includes a compressor and a variable speed discharge fan. The method includes determining, with a controller, a low fan capacity setting based on an operation of the compressor. The method also includes maintaining a discharge fan capacity at the low fan capacity setting, and varying a coil discharge air temperature between a low discharge air temperature limit and a high discharge air temperature limit. The method further includes when the coil discharge air temperature reaches the low discharge air temperature limit, varying the discharge fan capacity between the low fan capacity setting and a high fan capacity setting so as to maintain a space temperature at a space temperature setpoint, while maintaining the coil discharge air temperature at the low discharge air temperature limit.

18 Claims, 12 Drawing Sheets

Related U.S. Application Data continuation of application No. 14/076,670, filed on Nov. 11, 2013, now Pat. No. 9,651,321.

(60) Provisional application No. 61/724,673, filed on Nov. 9, 2012.

(51) Int. Cl.
*F24F 11/30* (2018.01)
*F24F 11/77* (2018.01)
*F24F 11/83* (2018.01)
*F24F 110/10* (2018.01)
*F24F 11/85* (2018.01)

(52) U.S. Cl.
CPC ............... *F28F 27/00* (2013.01); *F24F 11/85* (2018.01); *F24F 2110/10* (2018.01); *Y02B 30/746* (2013.01)

(56) References Cited

U.S. PATENT DOCUMENTS

| | | | |
|---|---|---|---|
| 5,005,636 A | 4/1991 | Haessig | |
| 5,115,968 A | 5/1992 | Grald | |
| 5,535,814 A | 7/1996 | Hartman | |
| 5,741,180 A | 4/1998 | Xia et al. | |
| 6,467,280 B2 | 10/2002 | Pham et al. | |
| 6,499,305 B2 | 12/2002 | Pham et al. | |
| 6,594,554 B1 | 7/2003 | Seem et al. | |
| 6,997,389 B2 | 2/2006 | Demster | |
| 7,010,392 B2 | 3/2006 | Bash et al. | |
| 7,083,109 B2 | 8/2006 | Pouchak | |
| RE42,195 E | 3/2011 | Bash et al. | |
| 8,190,273 B1 | 5/2012 | Federspiel et al. | |
| 8,688,243 B2 | 4/2014 | Federspiel et al. | |
| 9,651,321 B2 * | 5/2017 | Zhou | F28F 27/00 |
| 9,671,125 B2 | 6/2017 | Mowris et al. | |
| 10,197,300 B2 * | 2/2019 | Zhou | F28F 27/00 |
| 2002/0124992 A1 * | 9/2002 | Rainer | G05D 23/1931 165/11.1 |
| 2005/0278069 A1 | 12/2005 | Bash et al. | |
| 2007/0289322 A1 | 12/2007 | Mathews | |
| 2010/0107668 A1 * | 5/2010 | Voorhis | F24F 3/153 62/176.3 |
| 2010/0298983 A1 * | 11/2010 | Beste | H01R 13/6456 700/276 |
| 2012/0016526 A1 | 1/2012 | Burton | |
| 2012/0186774 A1 | 7/2012 | Matsuoka et al. | |
| 2012/0239208 A1 | 9/2012 | Federspiel et al. | |
| 2012/0273581 A1 | 11/2012 | Kolk et al. | |
| 2012/0303165 A1 | 11/2012 | Qu et al. | |
| 2013/0180700 A1 | 7/2013 | Aycock | |
| 2013/0261808 A1 * | 10/2013 | Besore | G05D 23/1904 700/278 |
| 2013/0261809 A1 | 10/2013 | Morrow et al. | |
| 2014/0000292 A1 * | 1/2014 | Kates | F24F 3/1603 62/56 |
| 2014/0096547 A1 | 4/2014 | Boehde | |
| 2015/0027151 A1 * | 1/2015 | Cur | F24F 1/0003 62/117 |
| 2017/0115025 A1 | 4/2017 | Mowris et al. | |
| 2017/0234559 A1 | 8/2017 | Federspiel et al. | |
| 2017/0254553 A1 | 9/2017 | Leal et al. | |
| 2017/0268792 A1 | 9/2017 | Costakis et al. | |
| 2017/0268797 A1 | 9/2017 | Mowris et al. | |
| 2017/0356668 A1 * | 12/2017 | Goel | F25B 49/022 |
| 2018/0010818 A1 | 1/2018 | Maruyama et al. | |
| 2018/0031261 A1 | 2/2018 | Bentz et al. | |

* cited by examiner

HVAC SYSTEM AND CORRESPONDING METHODS OF CONTROLLING HVAC FAN AND COIL CAPACITY

FIELD

The disclosure herein relates to heating, ventilation, and air-conditioning ("HVAC") systems and methods, and more particularly to fan capacity and cooling/heating coil capacity controls used in such HVAC systems and methods. Generally, systems and methods described herein are directed to coordinating fan capacity and cooling/heating coil capacity controls in the HVAC systems.

BACKGROUND

HVAC units and systems typically include cooling/heating coils and discharge fans. The discharge fans may be configured to drive airflow through the cooling/heating coils to control a space temperature, for example in a building, by modulating the airflow. The discharge fans and/or the cooling/heating coils can be controlled to regulate a volume and/or a temperature of the airflow.

SUMMARY

Methods of regulating a fan capacity of a discharge fan and a discharge air temperature of a cooling/heating coil in a HVAC system are described. The methods as disclosed herein can generally directed to varying the fan capacity and the discharge air temperature of the cooling/heating coil and to coordinating them to, for example, regulate a space temperature.

In some embodiments, such as a HVAC system with a two speed discharge fan, the method may include maintaining a discharge fan capacity at a low fan capacity setting and varying a coil discharge air temperature between a low discharge air temperature limit and a high discharge air temperature limit to maintain or modulate a space temperature. When the coil discharge air temperature reaches the low discharge air temperature limit, the discharge fan capacity can be varied between the low fan capacity setting and a high fan capacity setting to maintain or modulate a space temperature while maintaining the coil discharge air temperature at the low discharge air temperature limit.

In some embodiments, the method may include when the coil discharge air temperature reaches the high discharge air temperature limit, the discharge fan capacity can be varied between the low fan capacity setting and the high fan capacity setting to maintain the space temperature setpoint while maintaining the coil discharge air temperature at the high discharge air temperature limit.

In some embodiments, the method may include when the coil discharge air temperature reaches the low discharge air temperature limit and the discharge fan capacity reaches the high fan capacity setting, the discharge air temperature can be varied between the low discharge air temperature and a first boost discharge air temperature that is lower than the low discharge air temperature limit when, for example, extra cooling is needed. In some embodiments, the method may include when the coil discharge air temperature reaches the high discharge air temperature limit and the discharge fan capacity reaches the high fan capacity setting, the coil discharge air temperature can be varied between the high discharge air temperature limit and a second boost discharge air temperature that is higher than the high discharge air temperature limit when, for example, extra heating is needed.

In some embodiments, varying the discharge fan capacity may include selecting a fan speed of a discharge fan among a plurality of speed settings of the fan when a multiple speed discharge fan is used. The discharge fan capacity can be modulated by operating the discharge fan for a variable amount of time at different fan speeds. In some embodiments, varying the discharge fan capacity may include varying a fan speed of a discharge fan when a variable speed discharge fan is used.

In some embodiments, the method may include when a variable speed compressor and a variable speed discharge fan are used in the HVAC system, calculating the low fan capacity setting based on an operation speed of the variable speed compressor.

Other features and aspects of the systems, methods, and control concepts will become apparent by consideration of the following detailed description and accompanying drawings.

BRIEF DESCRIPTION OF THE DRAWINGS

Reference is now made to the drawings in which like reference numbers represent corresponding parts throughout.

FIG. 6A is directed to a fan capacity map of a two-speed discharge fan. FIG. 6B is directed to a fan capacity map of a three-speed discharge fan. FIG. 6C is directed to a fan capacity map of a variable speed discharge fan.

FIG. 9A illustrates a method to control a variable discharge air temperature, when a variable speed fan is used. FIG. 9B illustrates a method to control a coil discharge temperature, when a variable speed fan is used.

FIG. 10A is directed to a fan capacity map of a cooling mode of the HVAC system. FIG. 10B is directed to a fan capacity map of a heating mode of the HVAC system.

DETAILED DESCRIPTION

Fans and cooling/heating coils of a HVAC units and systems can be regulated to change a volume and a temperature of airflow delivered to a space of a building so as to regulate a temperature of the space. The discharge fans and the cooling/heating coils can be regulated independently or coordinately. Coordinating the regulations of the discharge fans and the cooling/heating coils may help increase efficiency of the HVAC system.

Methods to coordinate the regulations of a fan and a cooling/heating coil of a HVAC system are described herein. In some embodiments, the method may include a variable discharge air temperature modulating block that is configured to regulate a discharge air temperature of the cooling/heating coil of the HVAC system between a low discharge air temperature limit and a high discharge air temperature limit to maintain or modulate a space temperature, such as to maintain the space temperature at or about a space temperature setpoint, while maintaining a low fan capacity setting of a discharge fan. The method may also include a low discharge air temperature maintaining block that is configured to maintain the low discharge air temperature limit of the cooling/heating coil, while varying the fan capacity of the discharge fan to maintain or modulate the space temperature. In some embodiments, the method may include a high discharge air temperature maintaining block that is configured to maintain the high discharge air temperature limit of the cooling/heating coil, while varying the fan capacity of the discharge fan to maintain or modulate the space temperature. In some embodiment, the method may include a discharge capacity boost block that is configured to decrease (or elevate) the discharge air temperature of the cooling/heating coil from the low discharge air temperature limit (or the high discharge air temperature limit) so as to boost the cooling (or heating) capacity of the cooling/heating coil of the HVAC system if desired. The methods as described herein may be applicable to a HVAC system that has variable airflow capability, such as a HVAC system including a multiple speed discharge fan (e.g. a two-speed or three-speed discharge fan), as well as a variable speed discharge fan. The methods described herein may also be adapted to modulate a heating capacity and an airflow damper in a Variable Air Volume (VAV) unit.

References are made to the accompanying drawings that form a part hereof, and in which is shown by way of illustration of the embodiments in which the embodiments may be practiced. It is to be understood that the term used herein are for the purpose of describing the figures and embodiments and should not be regarded as limiting the scope.

Figure 1:
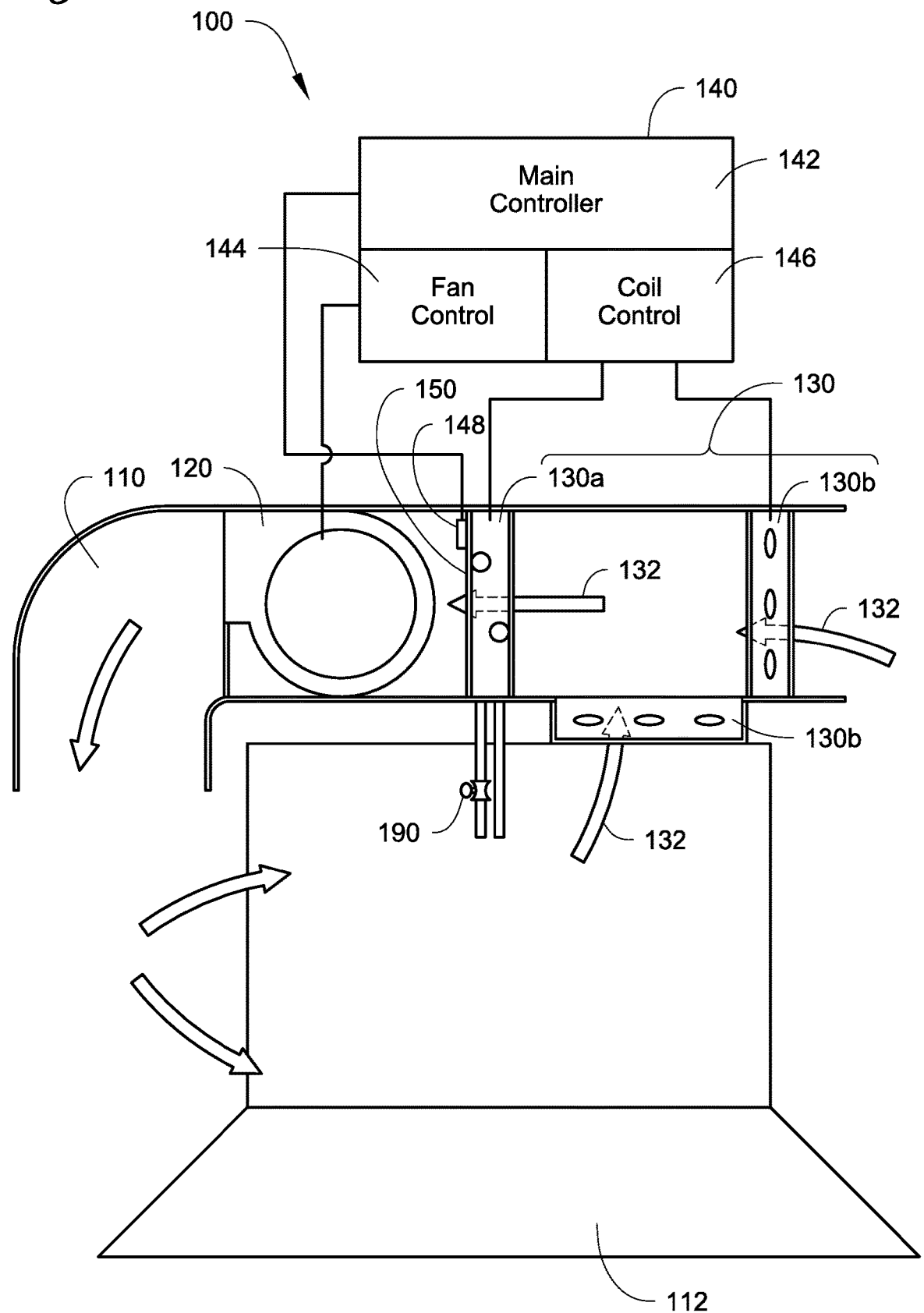
FIG. 1 illustrates an exemplary HVAC system, with which the embodiments as described herein may be practiced.

FIG. 1 illustrates an exemplary HVAC system 100, with which the methods described herein can be practiced. The HVAC system 100 includes an airflow duct 110 that is configured to direct air in and out of a space 112 through the airflow duct 110. The airflow duct 110 includes a fan 120 and a cooling/heating coil 130. The cooling/heating coil 130 can be configured to include a cooling coil 130a configured to provide cooling and a heating coil 130b configured to provide heating of airflow 132. The cooling coil 130a is equipped with a control valve 190.

A control module 140 includes a main controller 142 that is configured to coordinate a fan control module 144 and a coil control module 146. The fan control module 144 is configured to modulate the discharge fan 120 of the HVAC system 100, and the coil control module 146 is configured to modulate the cooling/heating coil 130.

A temperature sensor 148 is positioned near an exit 150 of the cooling/heating coil 130 and is configured to measure a discharge air temperature of the cooling/heating coil 130. The discharge air temperature measured by the temperature sensor 148 is sent to the main controller 142.

The discharge fan 120 is a fan that can generally be configured to provide a variable fan capacity, such as a multiple speed discharge fan (e.g. a two-speed or three-speed discharge fan) or a variable speed discharge fan. By changing the speed of the discharge fan 120, the capacity of the discharge fan 120 can be regulated. Generally, increasing the speed of the discharge fan 120 leads to more air being moved through the coil 130, which correlates to increasing a capacity of the HVAC system 100; while reducing the speed of the discharge fan 120 leads to less air being moved through the coil 130, which correlates to decreasing the capacity of the HVAC system 100.

In operation, the main controller 142 can be configured to receive information, such as temperature measured by the temperature sensor 148, a space temperature in the space 112, and/or a space temperature setpoint for the space 112. The main controller 142 can be configured to use the information to determine, for example, whether to increase or decrease fan speeds (or capacity) of the discharge fan 120, and/or whether to increase or decrease the discharge air temperature of the cooling/heating coil 130. The main controller 142 can be configured to instruct the fan control module 144 to regulate the fan speeds (or the capacities) of the discharge fan 120, and/or the coil control module 146 to modulate the discharge air temperature of the cooling/heating coil 130. The discharge air temperature of the cooling/heating coil 130 can be regulated, for example, by mechanically regulating the control valve 190. By regulating the fan capacity and/or the discharge air temperature of the cooling/heating coil 130, the space temperature in the space 112 can be maintained or changed. The fan capacity and/or the discharge air temperature of the cooling/heating coil 130 can also be modulated according to, for example, a load requirement of the HVAC system 100.

Generally, a higher fan speed or fan capacity of the discharge fan 120 and/or a lower discharge air temperature of the coil 130 are associated with a higher capacity of the HVAC system 100 in a cooling mode; and a lower fan speed or fan capacity of the discharge fan 120 and/or a higher discharge air temperature of the coil 130 are associated with a lower capacity of the HVAC system 100 in a cooling mode. Likewise, a higher fan speed or fan capacity of the discharge fan 120 and/or a higher discharge air temperature of the coil 130 are associated with a higher capacity of the HVAC system in a heating mode; and a lower fan speed or fan capacity of the discharge fan 120 and/or a lower discharge air temperature of the coil 130 are associated with a lower capacity of the HVAC system in a heat mode.

It is to be appreciated that the embodiment of the HVAC system 100 is exemplary. Embodiments of the methods described herein can also be used with other HVAC configurations. Generally, the methods described herein can be used with a HVAC system that includes a fan configured to provide a variable capacity and/or a cooling/heating coil configured to provide a variable discharge air temperature.

It is to be appreciated that in some embodiments, the HVAC system 100 may be configured to include the heating coil 130b or the cooling coil 130a only, and consequently only heating or cooling is provided by the HVAC system 100. It is generally known in the art that methods configured to modulate cooling and heating together can be modified to modulating cooling only or heating only.

Figure 2:
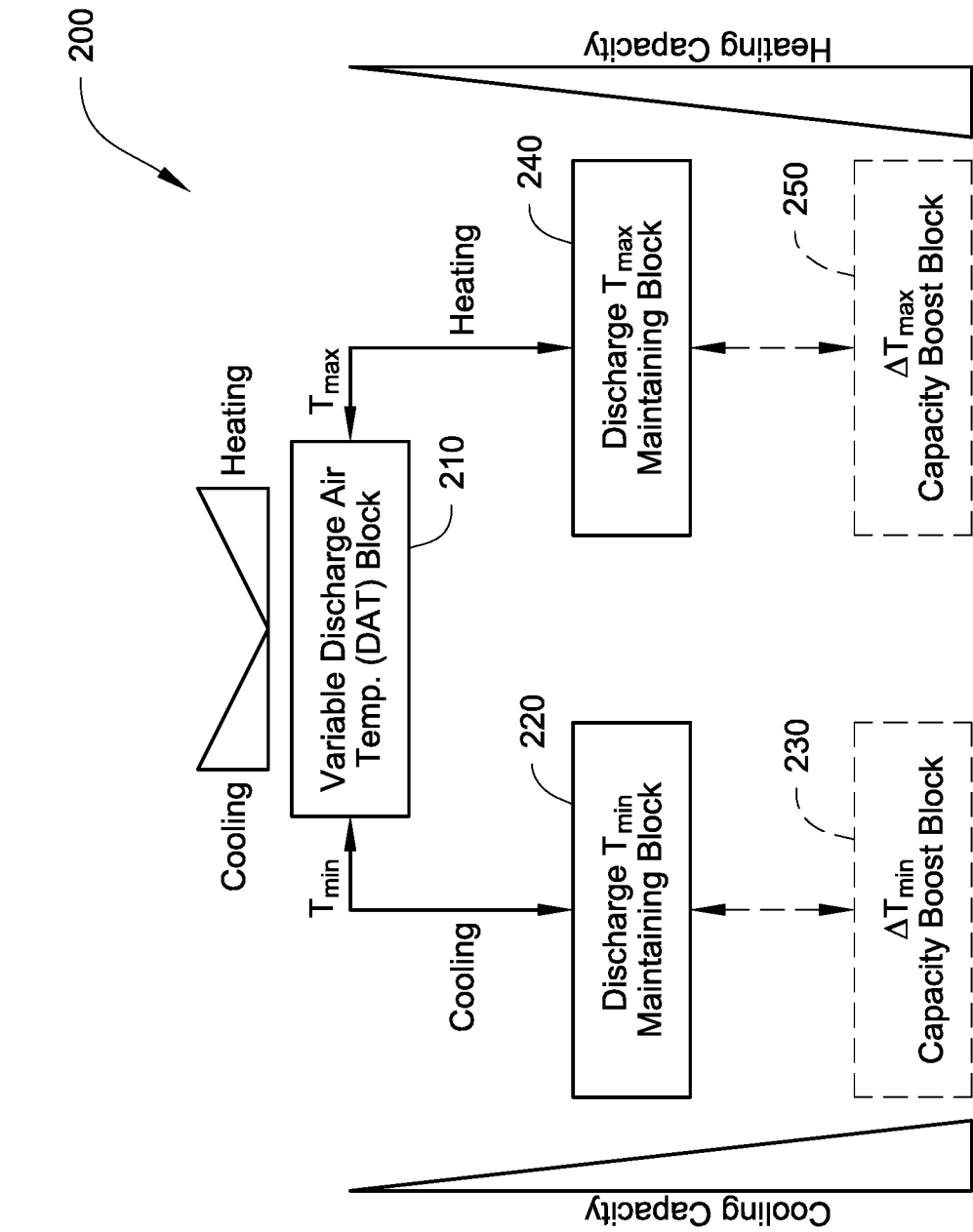
FIG. 2 illustrates a method to control a HVAC system, according to one embodiment.

FIG. 2 illustrates a method 200 that can be executed by a controller of a HVAC system, for example, the main controller 142 of the HVAC system 100 in FIG. 1, so that a space temperature can be maintained at a space temperature setpoint or the space temperature can be changed to for example a new space temperature setpoint. The controller can be configured to control a fan and/or a cooling/heating coil of the HVAC system (e.g. the discharge fan 120 and/or the cooling/heating coil 130 in FIG. 1). The method 200 generally includes five control blocks: a variable discharge air temperature modulating block 210, a cooling discharge air temperature $T_{min}$ maintaining block 220, an optional $\Delta T_{min}$ cooling capacity boost block 230, a heating discharge air temperature $T_{max}$ maintaining block 240 and an optional $\Delta T_{max}$ heating capacity boost block 250.

The variable discharge air temperature (DAT) modulating block 210 is typically configured to work with both a cooling mode and a heating mode to maintain or modulate the space temperature. The cooling mode is generally referred to as a HVAC operation mode when the discharge air temperature of the cooling/heating coil is lower than the space temperature of a space (e.g. the space 112 in FIG. 1). The heating mode is generally referred to as a HVAC operation mode when the discharge air temperature of the cooling/heating coil is higher than the space temperature of the space.

In the variable discharge air temperature modulating block 210, the controller can determine the discharge air temperature of the cooling/heating coil based on, for example, the space temperature in the space and/or the temperature setpoint in the space. For example, if cooling is needed, the controller can raise a capacity of the cooling coil (such as the cooling coil 130a in FIG. 1) and/or reduce a capacity of the heating coil (such as the heating coil 130b in FIG. 1), so that the discharge air temperature of the cooling/heating coil is configured to be below the space temperature in the space. The controller can regulate the capacity of the cooling coil by, for example, mechanically regulating a control valve (such as the control valve 190 in FIG. 1). The controller can similarly control the capacity of the cooling/heating coil in the heating mode. If more heating is needed, the controller can raise the capacity of the heating coil and/or reduce the capacity of the cooling coil, so that the discharge air temperature of the cooling/heating coil is configured to be above the space temperature in the space.

Two discharge air temperature limits $T_{min}$ and $T_{max}$ can be set up and used in the variable discharge air temperature modulating block 210. The $T_{min}$ may be the low temperature limit that the cooling/heating coil is designed to discharge in a cooling operation. The $T_{max}$ may be the high temperature limit that the cooling/heating coil is designed to discharge in a heating operation. The $T_{min}$ and $T_{max}$ are typically fixed values. The $T_{min}$ and $T_{max}$ can be set up by an engineer, for example, based on a designed limit, a capacity limit, a comfort limit of occupancy in the space, and/or safe operation limits. The $T_{min}$ and $T_{max}$ may also be provided by a manufacturer. It is noted that in some embodiments, the $T_{min}$ and the $T_{max}$ may not be the lowest temperature and the highest temperature that the cooling/heating coil is capable of providing.

As illustrated in FIG. 2, in the variable discharge air temperature modulating block 210, the controller can determine whether the HVAC system is operated in the cooling mode or in the heating mode. In the cooling mode, the controller can generally change the discharge air temperature toward the $T_{min}$ if more cooling capacity is required in the variable discharge air temperature modulating block 210. Likewise, in the heating mode, the controller can generally change the discharge air temperature toward the $T_{max}$ if more heating capacity is required in the variable discharge air temperature modulating block 201.

When the discharge air temperature of the cooling/heating coil reaches the $T_{min}$, which generally is when only the cooling coil is in operation, the controller can be configured to proceed to the cooling discharge air temperature $T_{min}$ maintaining block 220. In some embodiments, the controller can be configured to proceed to the cooling discharge air temperature $T_{min}$ maintaining block 220 when, for example, a designed cooling capacity limit of the cooling/heating coil is reached. The designed cooling capacity limit can be determined, for example, by a HVAC manufacturer and/or space comfort needs.

The cooling discharge air temperature $T_{min}$ maintaining block 220 is configured to maintain or modulate the space temperature while maintaining the discharge air temperature of the heating/cooling coil at or about the $T_{min}$ in the cooling mode. This can be achieved typically by regulating a fan capacity of a discharge fan configured to move airflow through the heating/cooling coil, such as the discharge fan 120 as shown in FIG. 1. The fan capacity can be regulated for example by increasing or decreasing a fan speed of the discharge fan. Generally, as illustrated in FIG. 2, if more cooling capacity is required, in the cooling discharge air temperature $T_{min}$ maintaining block 220, the fan capacity can be increased.

As illustrated in FIG. 2, in the heating mode, the controller can generally change the discharge air temperature toward the $T_{max}$ if more heating capacity is required in the variable discharge air temperature modulating block 210.

When the discharge air temperature of the cooling/heating coil reaches the $T_{max}$, which generally is when only the heating coil is in operation, the controller proceeds to the heating discharge air temperature $T_{max}$ maintaining block 240.

The heating discharge air temperature $T_{max}$ maintaining block 240 is configured to maintain or modulate the space temperature while maintaining the discharge air temperature of the heating/cooling coil at or about the $T_{max}$ in the heating mode and regulate the fan capacity of the discharge fan configured to move airflow through the heating/cooling coil to maintain space temperature at its setpoint. The fan capacity can be regulated, for example, by increasing or decreasing the fan speed of the discharge fan. Generally, as illustrated in FIG. 2, if more heating capacity is required, in the heating discharge air temperature $T_{max}$ maintaining block 240, the fan capacity can be increased.

In some embodiments, the cooling/heating coil may not reach its maximum capacity in the cooling discharge air temperature $T_{min}$ maintaining block 220 when the discharge fan reaches its maximum fan speed or capacity, and/or in the heating discharge air temperature $T_{max}$ maintaining block 240 when the discharge fan reaches its maximum fan speed or capacity. The controller can be configured to optionally proceed to the $\Delta T_{min}$ cooling capacity boost block 230 and/or the A $T_{max}$ heating capacity boost block 250 in the cooling mode and the heating mode respectively. In the optional $\Delta T_{min}$ cooling capacity boost block 230 and the optional $\Delta T_{max}$ heating capacity boost block 250, the discharge air temperature limit $T_{min}$ or $T_{max}$ of the cooling/heating coil can be configured to be reduced by $\Delta T_{min}$ in the cooling mode or raised by $\Delta T_{max}$ in the heating mode respectively. Reducing the cooling discharge air temperature limit $T_{min}$ in the cooling mode or increasing the heating discharge air temperature limit $T_{max}$ in the heating mode respectively can help increase the cooling/heating coil capacity beyond, for example the design limits, when desired, such as for example to maintain the space temperature setpoint in an extreme environmental temperature or to achieve fast cooling or heating.

It is appreciated that generally the fan speed is associated with fan capacity. Generally, the higher the fan speed is, the higher the fan capacity and vise verse.

$\Delta T_{min}$ and/or $\Delta T_{max}$ can be determined based on information provided, for example, by a manufacturer of the cooling/heating coil. Generally, $\Delta T_{min}$ and/or $\Delta T_{max}$ may be configured so that the cooling/heating coil is capable of providing the discharge air temperature at a low boost temperature limit ($T_{min}-\Delta T_{min}$) in the cooling mode and/or at a high boost temperature limit ($T_{max}+\Delta T_{max}$) in the heating mode. In one embodiment, the $\Delta T_{min}$ is about 5° F. and/or $\Delta T_{max}$ is about 20° F.

In the $\Delta T_{min}$ cooling capacity boost block 230 and the $\Delta T_{max}$ heating capacity boost block 250, the controller can be configured to, for example, gradually lower the discharge air temperature toward the low boost temperature limit ($T_{min}-\Delta T_{min}$) or raise the discharge air temperature toward the high boost temperature limit ($T_{max}+\Delta T_{max}$) when more extra cooling or heating is required respectively, while maintaining the discharge fan at a high capacity setting.

As illustrated in FIG. 2, generally in the cooling mode, the controller is configured to proceed from the variable discharge air temperature modulating block 210, to the cooling discharge air temperature $T_{min}$ maintaining block 220, and optionally to the $\Delta T_{min}$ cooling capacity boost block 230 in sequence, while the cooling capacity required by the space generally increases. Generally, in the heating mode, the controller proceeds from the variable discharge air temperature modulating block 210, to the heating discharge air temperature $T_{max}$ maintaining block 240, and optionally to the $\Delta T_{max}$ heating capacity boost block 250 in sequence, while the heating capacity required by the space increases. It is to be appreciated, however, that it may not be necessary for the controller to proceed from one control block to another control block in any particular order. Any of the operation blocks can be independently executed.

FIGS. 3, 4, 5, 6A-6C, 7, 8, 9A-9B and 10A-10B illustrate embodiments that can be incorporated into the method 200 as illustrated in FIG. 2.

Figure 3:
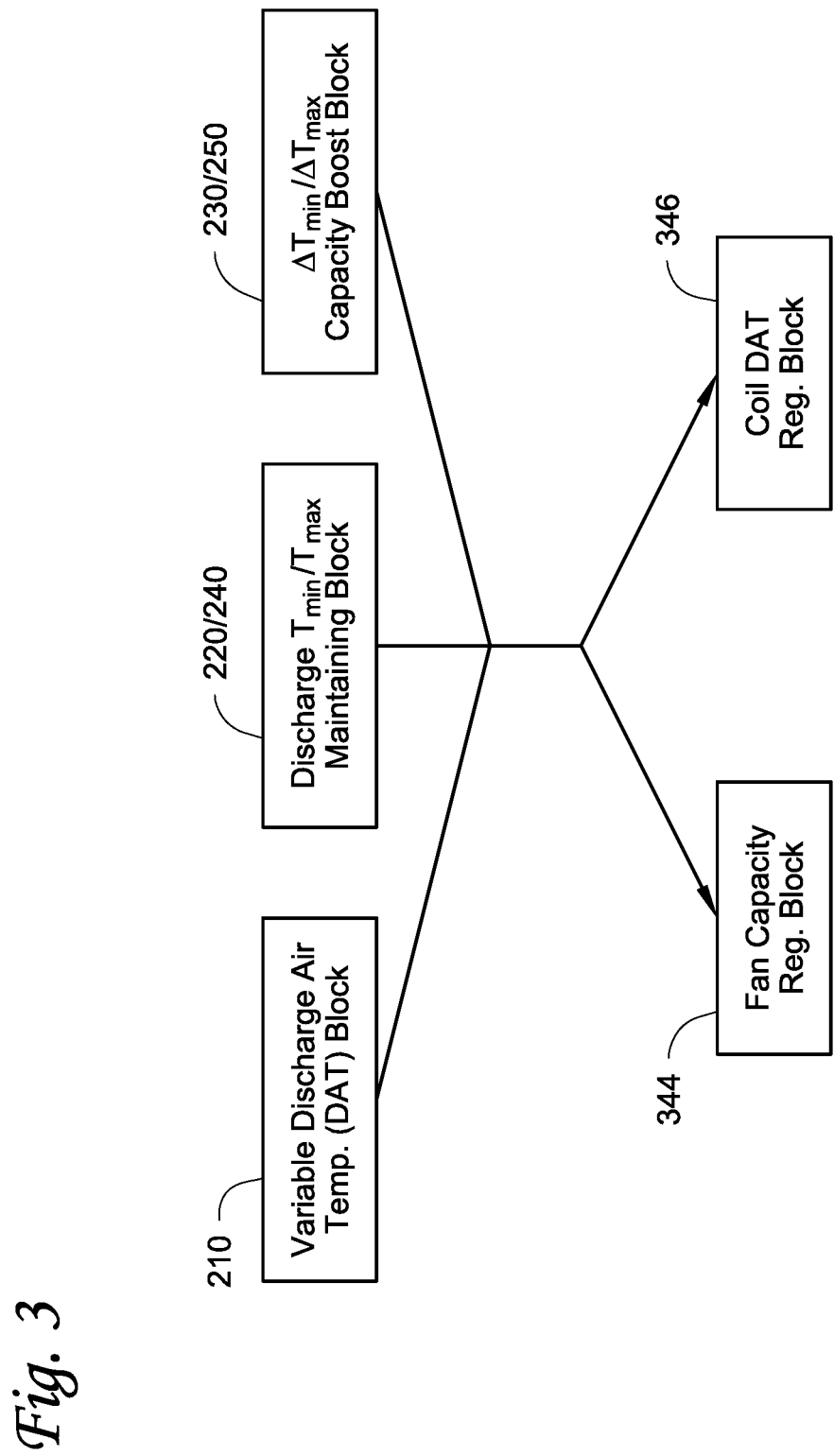
FIG. 3 illustrates an embodiment that can be incorporated into the method as described in FIG. 2.

FIG. 3 illustrates that any of the variable discharge air temperature modulating block 210, the discharge air temperature $T_{min}/T_{max}$ maintaining blocks 220/240, and/or the optional $\Delta T_{min}/\Delta T_{max}$ capacity boost blocks 230/250 as illustrated in FIG. 2 can include a fan capacity regulating block 344 to regulate a fan capacity and a coil DAT regulating block 346 to regulate a coil discharge temperature.

The fan capacity regulating block 344 can be configured to include a method to control a fan capacity (or an operational speed) of a discharge fan (e.g. the discharge fan 120 in FIG. 1). The fan capacity regulating block 344 can be executed by a fan controller, such as the fan control module 144 in FIG. 1.

The coil DAT regulating block 346 can be configured to include a method to control a capacity of a coil (e.g. the cooling/heating coil 130 in FIG. 1). The coil DAT regulating block 346 can be executed by a coil controller, such as the coil control module 146 in FIG. 1. By including a method of controlling the fan capacity and a method of controlling the cooling/heating coil in each control block, it is possible to coordinate the control of the discharge fan and the cooling/heating coil in any of the control block (e.g. the variable discharge air temperature modulating block 210, the discharge air temperature $T_{min}/T_{max}$ maintaining blocks 220/ 240, and/or the optional $\Delta T_{min}/\Delta T_{max}$ capacity boost blocks 230/250 as illustrated in FIG. 2).

Figure 4:
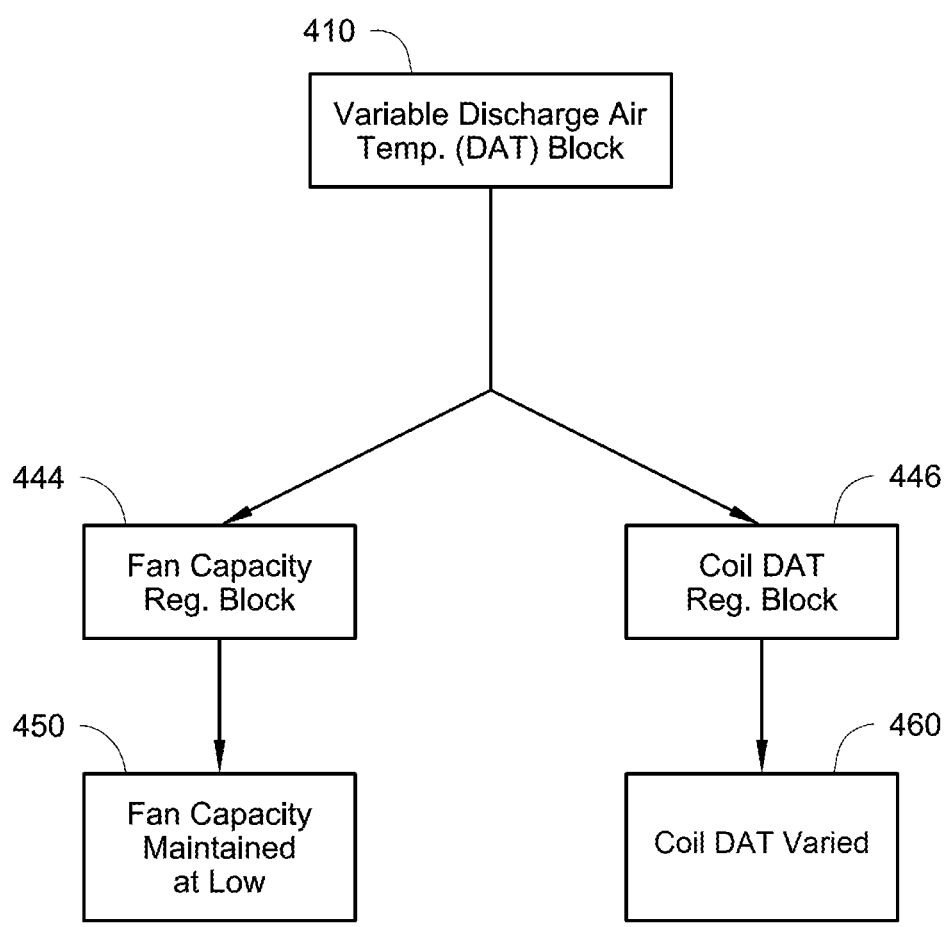
FIG. 4 illustrates a method to control a fan capacity of a discharge fan and a coil discharge air temperature, according to one embodiment.

FIG. 4 illustrates one embodiment of a variable discharge air temperature modulating block 410 (see 210 in FIG. 2), which includes a fan capacity regulating block 444 and a coil DAT regulating block 446.

Generally, in the variable discharge air temperature modulating block 410 as illustrated in FIG. 4, the fan capacity is generally maintained at or about a low capacity setting (which is performed by the fan capacity regulating block 444), while the discharge air temperature of the coil is regulated to maintain or modulate the temperature of the space (which is performed by the coil DAT regulating block 446).

The fan capacity regulating block 444 is configured to include a method 450, which is configured to maintain a discharge fan at or about the low fan capacity (e.g. operate the discharge fan at or about a low fan speed) setting.

The method 450 may be adapted to accomodate different types of discharge fans. For example, when a two-speed discharge fan with a high speed setting and a low speed setting is used, the method 450 can be configured to maintain the fan speed at or about the low speed setting. When a three-speed discharge fan with a high speed setting, an intermediate speed setting and a low speed setting is used, the method 450 can be configured to maintain the fan speed at or about the low speed setting. When a variable speed discharge fan with a continuously variable speed from a low speed setting to a high speed setting is used, the method 450 can be configured to maintain the fan speed at or about the low fan speed setting. The low fan speed settings can be provided, for example, by a manufacturer of the HVAC system, or determined based on, for example, ventilation, fan stability, coil effectiveness, sound, agency regulations, and/or machine safety requirements.

The coil DAT regulating block 446 is configured to include a method 460, which is configured to vary a discharge air temperature of a coil (e.g. the heating/cooling coil 130 in FIG. 1) so that a space temperature (such as the space 112 in FIG. 1) can be maintained or modulated. As illustrated in FIG. 2, generally the discharge air temperature of the coil may be varied between the $T_{min}$ and the $T_{max}$. In the HVAC system 100 as illustrated in FIG. 1, the discharge air temperature can be regulated by changing the cooling capacity and/or heating capacity of the cooling coil 130a and/or the heating coil 130b.

Figure 5:
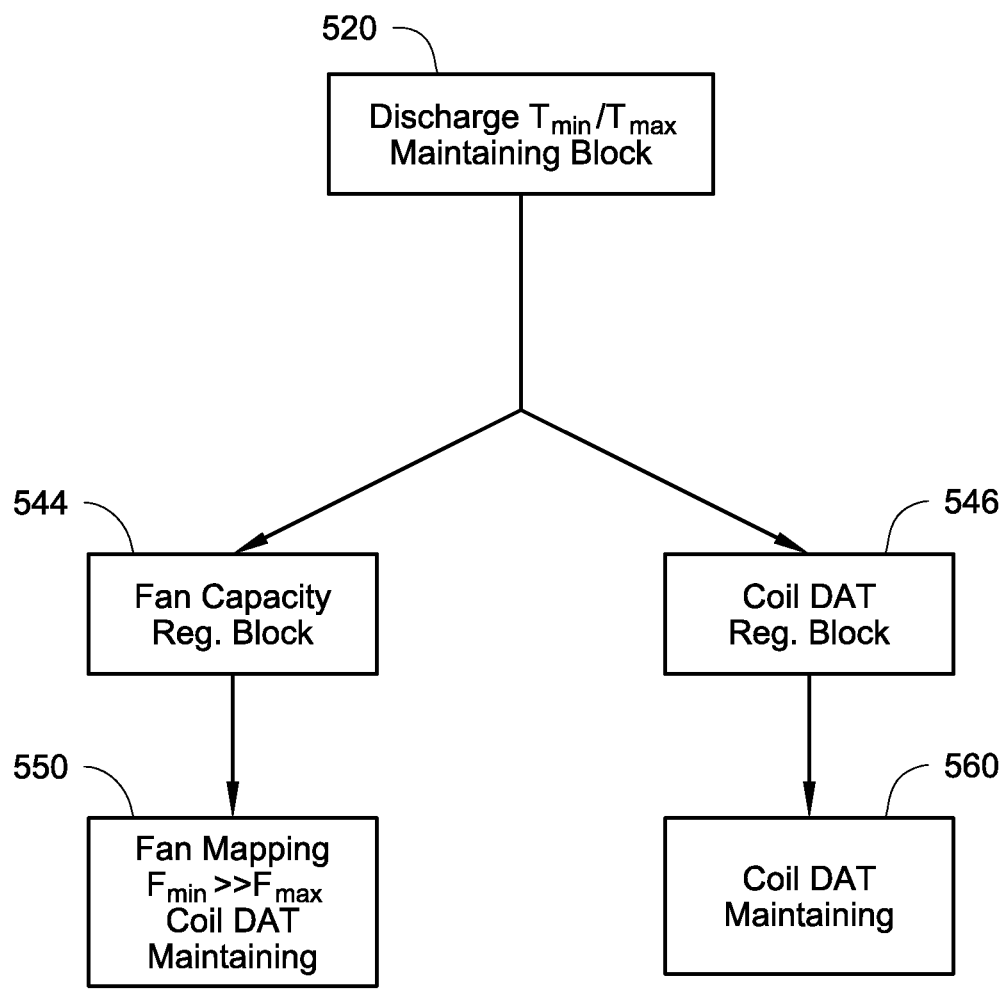
FIG. 5 illustrates a method to control a fan capacity of a discharge fan and a coil discharge air temperature, according to another embodiment.

FIG. 5 illustrates an embodiment of a discharge air temperature $T_{min}/T_{max}$ maintaining block 520, which includes a fan capacity regulating block 544 and a coil DAT regulating block 546.

Generally, in the discharge air temperature $T_{min}/T_{max}$ maintaining block 520 as illustrated in FIG. 5, the coil discharge air temperature is generally maintained at or about a designed low (or high) discharge air temperature limit $T_{min}$ (or the $T_{max}$) (which is performed by the coil DAT regulating block 546), while the fan capacity is mapped (or modulated) to maintain or modulate the space temperature at or about its setpoint while maintaining the coil discharge air temperature at or about the $T_{min}$ or the $T_{max}$ (which is performed by the fan capacity regulating block 544).

The coil DAT regulating block 546 includes a method 560, which is configured to maintain a coil discharge air temperature of the coil (such as the cooling/heating coil 130 in FIG. 1). Referring back to FIG. 2, the controller proceeds from the variable discharge air temperature modulating block 210 to the discharge air temperature limit $T_{min}$(or $T_{max}$) maintaining block 220 (or 240), when the discharge air temperature of the cooling/heating coil, for example, reaches the $T_{min}$ (or the $T_{max}$). In the method 560, this designed low ($T_{min}$) or high discharge air temperature limit ($T_{max}$) is maintained by the coil DAT regulating block 546.

The fan capacity regulating block 544 is configured to include a method 550. The method 550 is configured to modulate a fan capacity (such as the discharge fan 120 in FIG. 1) to maintain or modulate the space temperature while maintaining a discharge air temperature (e.g. the $T_{min}/T_{max}$) of the coil. Modulating the fan capacity can be achieved by, for example, a proportional integral (PI) control method. Generally, in the cooling mode, if the discharge air temperature is deviated higher from the $T_{min}$, the discharge fan may be mapped to provide a lower fan capacity; while if the discharge air temperature is deviated lower from the $T_{min}$, the discharge fan may be mapped to provide a higher fan capacity. In the heating mode, if the discharge air temperature is deviated higher from the $T_{max}$, the discharge fan may be mapped to provide a higher fan capacity; while if the discharge air temperature is deviated lower from the $T_{max}$, the discharge fan may be mapped to provide a lower fan capacity. The term "map" generally means regulate a fan capacity of the discharge fan, which may include determining the operation speed of the discharge fan and/or operation time of the discharge fan at the operation speed.

The discharge fan is generally a discharge fan capable of providing a variable fan capacity, such as a fan with a multiple speed settings or a variable speed discharge fan. The capacity of the discharge fan is generally referred to as an airflow volume moved by the discharge fan in a given period of time. The discharge fan can be configured to have a low capacity $F_{low}$ setting and a high capacity $F_{high}$ setting.

For a two-speed discharge fan with a high speed setting and a low speeding setting, the $F_{low}$ may be associated with the fan capacity when the discharge fan operates at the low speed setting, while the $F_{high}$ may be associated with the fan capacity when the discharge fan operates at the high speed setting. The method 550 may be configured to operate the fan at either the high speed setting or the low speed setting. The fan capacity can be regulated by switching the discharge fan between the two speed settings.

For a three-speed discharge fan with a high speed setting, an intermediate speed setting and a low speed setting, the $F_{low}$ may be be associated with the low speed setting, while the $F_{high}$ may be configured to be associated with the high speed setting. The method 550 may be configured to include an intermediate capacity setting $F_{int}$, and the intermediate capacity setting $F_{int}$ may be associated with the intermediate speed setting. The method 550 may be configured to choose the fan speed among the three speed settings for the three-speed discharge fan.

For a variable speed discharge fan, the $F_{low}$ may be associated with the low speed setting of the variable speed discharge fan, and the $F_{high}$ may be associated with the high speed setting of the variable speed discharge fan. The method 550 may be configured to determine the fan speed between the low speed setting and the high speed setting for the variable speed discharge fan to maintain or modulate the space temperature while maintaining the discharge air temperature of the cooling/heating coil.

It is to be appreciated that the fans described herein are exemplary. Other fans configured to provide a variable fan capacity can also be used.

Figure 6A:
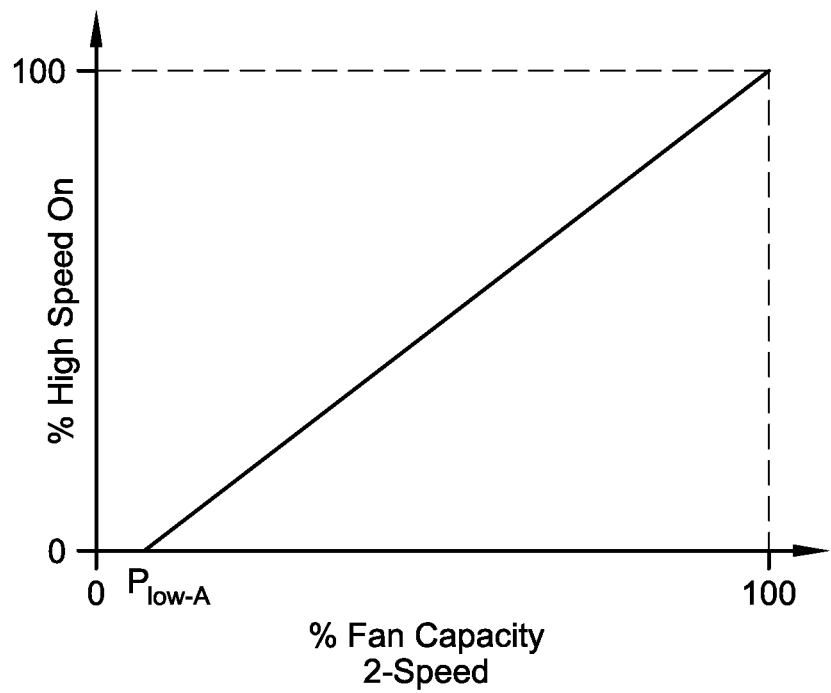
FIGS. 6A to 6C illustrate three fan capacity maps that can be used with the method as described in FIG. 2 or FIG. 5.
Figure 6B:
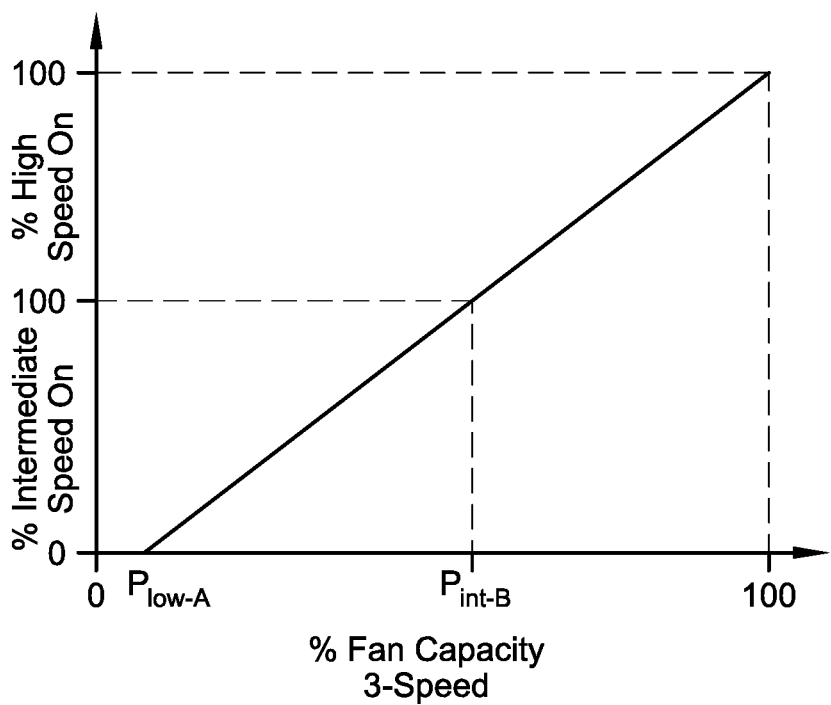
Figure 6C:
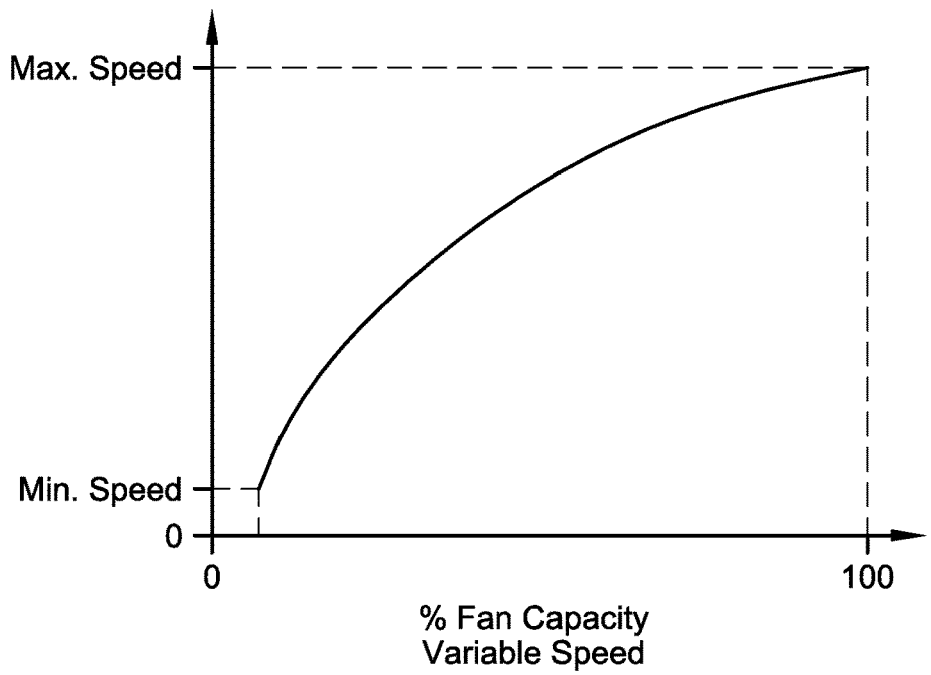

FIGS. 6A to 6C illustrate three embodiments of fan capacity maps that can be used in the method 550 to determine a fan speed of the discharge fan as illustrated in FIG. 5. Generally, the fan capacity is defined as an airflow volume moved by the discharge fan in a given period of time (such as for example 20 minutes). The fan capacity may be generally associated with the operation speed of the fan as well as the amount of time the fan operate at the operation speed. The fan capacity maps as illustrated in FIGS. 6A to 6C can be used to determine the operation speed and the amount of time the discharge fan should be operated at the operation speed.

For a discharge fan that have distinctive speed settings, such as a two speed or three speed discharge fan, generally the higher amount of time the discharge fan is operated at a relatively high speed setting in the given period of time is associated with a higher fan capacity. The higher amount of time the discharge fan is operated at a relatively low speed setting in the given period of time is associated with a lower fan capacity.

FIG. 6A illustrates a fan capacity map for a two-speed discharge fan configured to have a high speed setting and a low speed setting. As illustrated, when the discharge fan is operated at or about the high speed setting constantly, the fan capacity is associated with 100% of a high fan capacity setting. When the discharge fan is operated at or about the low speed setting constantly, the fan capacity is at or about $P_{low-A}$. $P_{low-A}$ is a fan capacity relative to the high fan capacity setting when the two-speed discharge fan is operated at the low speed setting (in terms of percentage of the high fan capacity setting). The $P_{low-A}$ can be measured when the discharge fan is operated at the low speed setting or can be provided by a manufacturer of the discharge fan. To regulate the fan capacity of the discharge fan with two speed setting, the fan can be operated at either the high speed setting or the low speed setting for certain portions of the given period time (e.g. about 20 minutes). The discharge fan can be cycled between the high speed fan setting and the low speed fan setting.

In operation, the fan capacity can be mapped to the percentage of time on which the two-speed discharge fan operates at or about the high speed setting (or at or about the low speed setting) in a given period of time. If a higher fan capacity is required to maintain or modulate the space temperature while maintaining the discharge air temperature of the coil, the discharge fan can be mapped to operate on the high speed setting for a larger percentage of time. Conversely, if a lower fan capacity is required to maintain or modulate the space temperature while maintaining the discharge air temperature of the coil, the discharge fan can be mapped to a lower percentage of time to operate the discharge fan at or about the high speed setting. By changing the percentage of time on which the two-speed discharge fan operates at or about the high speeding setting (or the low speed setting), the fan capacity can be provided as a combined total airflow volume provided by the low speed setting and the high speed setting over the given period of time. In one embodiment, the period of time can be for example about 20 minutes, with the appreciation that other amounts of time can be used.

FIG. 6B illustrates a fan capacity map for a three-speed discharge fan, which is configured to have a high speed setting, an intermediate speed setting and a low speed setting. When the discharge fan is operated at or about the high speed setting constantly, the fan capacity is associated with 100% of a high fan capacity setting. When the discharge fan is operated at or about the low speed setting constantly, the fan capacity is $P_{low-B}$ which is a fan capacity relative to the fan capacity of the high fan capacity setting (in terms of percentage of the high fan capacity setting). When the discharge fan is operated at or about the intermediate speed setting constantly, the fan capacity is $P_{int-B}$ which is a fan capacity relative to the fan capacity of the high fan capacity setting (in terms of percentage of the high fan capacity setting). The high speed setting, the intermediate speed setting and the low speed setting can be provided by, for example, a manufacturer of the discharge fan.

In operation, the fan capacity can be mapped to a percentage of time on which the three-speed discharge fan operates at or about the high speed setting, the intermediate speed setting or the low speed setting in a given period of time.

If a fan capacity required to maintain or modulate the space temperature while maintaining the discharge air temperature of the coil is lower than the $P_{int-B}$, the discharge fan can be operated between the low speed setting and the intermediate speed setting. The fan capacity can be mapped to a percentage of time on which the three-speed discharge fan operates at or about the intermediate speed setting (or the lower speed setting). A higher fan capacity requirement can be mapped to a higher percentage of time on which the three-speed discharge fan operates at or about the intermediate speed setting or a lower percentage of time on which the three-speed discharge fan operates at or about the low speed setting. A lower fan capacity requirement can be mapped to a lower percentage of time on which the three-speed discharge fan operates at or about the intermediate speed setting or a higher percentage of time on which the three speed discharge fan operates at or about the low speed setting.

If the fan capacity required to maintain or modulate the space temperature while maintaining the discharge air temperature of the coil is higher than the $P_{int-B}$, the discharge fan can be operated between the intermediate speed setting and the high speed setting. The fan capacity can be mapped to a percentage of time on which the three-speed discharge fan operates at or about the high speed setting (or the intermediate speed setting). A higher fan capacity requirement can be mapped to a higher percentage of time on which the three-speed discharge fan operates at or about the high speed setting or a lower percentage of time on which the three speed discharge fan operates at or about the intermediate speed setting. A lower fan capacity requirement can be mapped to a lower percentage of time on which the three-speed discharge fan operates at or about the high speed setting or a higher percentage of time on which the three speed discharge fan operates at or about the intermediate speed setting.

FIG. 6C illustrates a fan capacity map for a variable speed discharge fan, which is configured to have a continuous variable speed between a low speed setting and a high speed setting. When a continuous variable speed discharged fan is used, a specific fan capacity can be associated with a specific fan speed. As illustrated, the fan capacity required to maintain or modulate the space temperature while maintaining the discharge air temperature of the coil can be continuously mapped to a speed at which the variable speed discharge fan can operate.

In operation, if a higher fan capacity is required to maintain or modulate the space temperature while maintaining the discharge air temperature of the coil, the discharge fan can be mapped to a higher fan speed. If a lower fan capacity is required to maintain or modulate the space temperature while maintaining the discharge air temperature of the coil, the discharge fan can be mapped to a lower fan speed.

It is to be appreciated that the methods described herein can be used with other multiple speed discharge fan configurations. It is further to be appreciated that the fan capacity maps illustrated in FIGS. 6A to 6C are exemplary. The fan capacity maps can be, for example, modified for a particular HVAC system.

In some HVAC systems, such as a variable air volume (VAV) unit, an air handler fan speed may be variable to maintain a constant duct static pressure. Airflow may be regulated by an airflow damper, such as an airflow damper as taught in the U.S. Pat. No. 5,741,180. The airflow damper can be modulated by opening up or closing down an airflow path of the airflow damper. The methods and systems as disclosed herein can be adapted to control the airflow damper. For example, the method 550 as illustrated in FIG. 5 can be adapted to control the airflow damper. Generally, if a higher airflow is required to maintain or modulate the space temperature, the airflow damper can be configured to open up to increase the airflow. If a lower airflow is required to maintain or modulate the space temperature, the airflow damper can be configured to close down to decrease the airflow.

Figure 7:
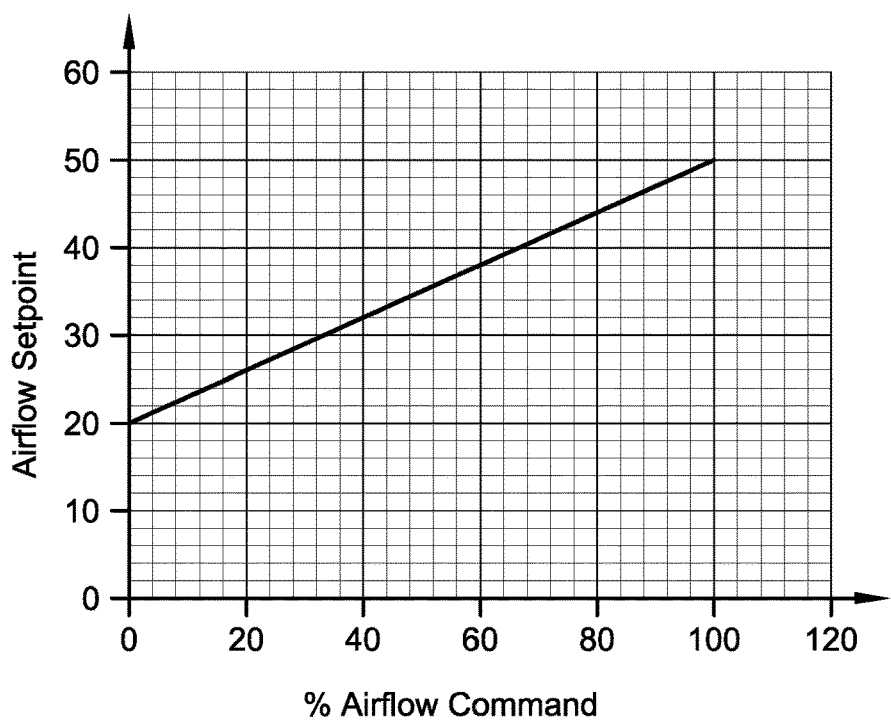
FIG. 7 illustrates a capacity map of an airflow damper, which may be used with the method as illustrated in FIG. 2 or FIG. 5.

FIG. 7 illustrates an airflow damper map that can be used, for example, with the method 550 to control the airflow damper.

As illustrated in FIG. 7, when the airflow command of the airflow damper is 100% (fully open), the airflow is mapped to a maximum airflow setpoint in the VAV unit (about 48 in the illustrated embodiment). If the airflow command of the airflow damper is 0% (fully closed), the airflow is mapped to the minimum airflow setpoint in the VAV unit (about 20 in the illustrated embodiment). The airflow setpoint is an indication of an amount of airflow volume in the VAV unit. The higher the value, the higher the amount of airflow volume in the VAV is.

In operation, if a higher airflow volume is required to maintain or modulate the space temperature while maintaining the discharge air temperature of the coil, the airflow damper can be opened up. If a lower airflow volume is required to maintain or modulate the space temperature while maintaining the discharge air temperature of the coil, the discharge fan can be closed down.

It is to be appreciated that the embodiments as disclosed herein can be used with other method of regulating fan capacity or airflow volume.

Figure 8:
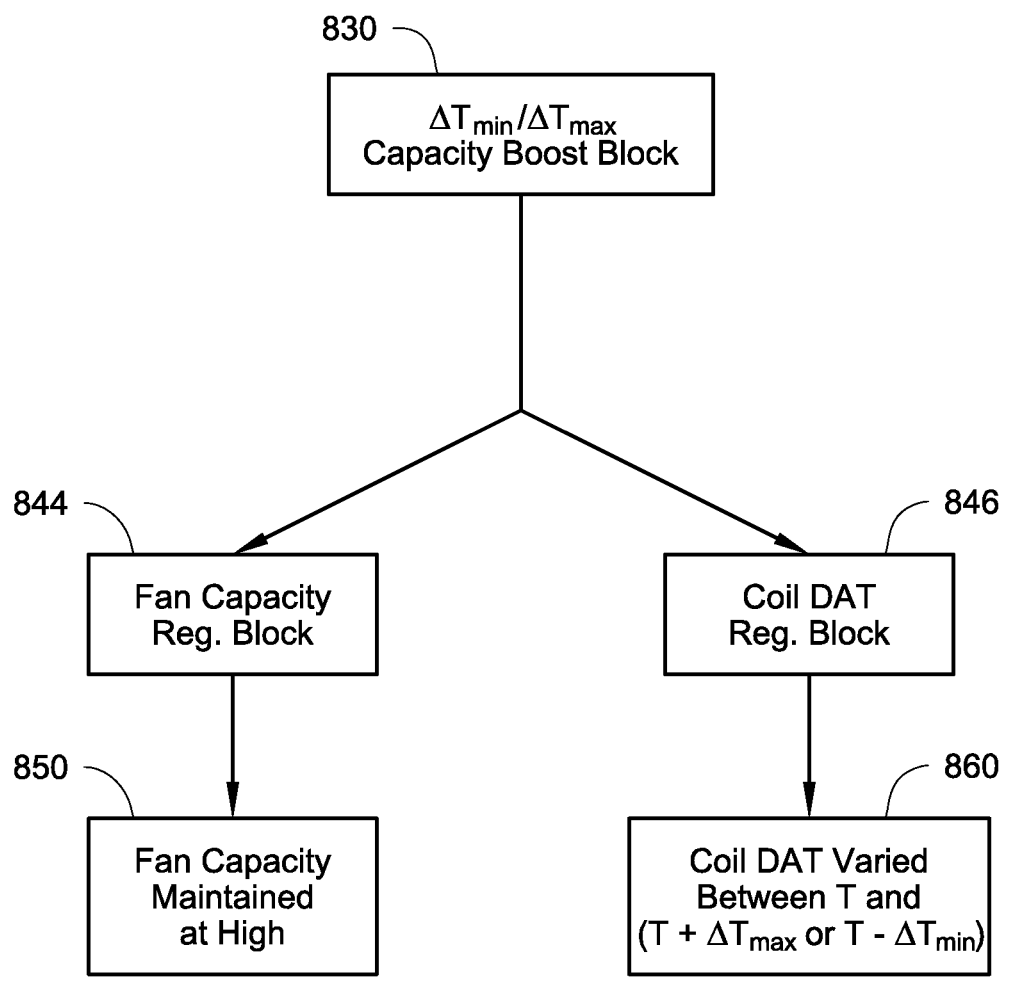
FIG. 8 illustrates yet another method to control a fan capacity of a discharge fan and a coil discharge air temperature.

FIG. 8 illustrates an embodiment of an optional $\Delta T_{min}/\Delta T_{max}$ boost block 830, which includes a fan capacity regulating block 844 and a coil DAT regulating block 846. The embodiments can be used with the $\Delta T_{max}/\Delta T_{max}$ capacity boost blocks 230, 250 as illustrated in FIG. 2.

The fan capacity regulating block 844 includes a method 850, which is configured to maintain a fan capacity of a fan at or about a high fan capacity setting. That is, the discharge fan is operated at or about a high speed setting of multiple speeding settings.

The coil DAT regulating block 846 includes a method 860. The method 860 is configured to change a discharge air temperature from a designed coil discharge air temperature limit (e.g. $T_{min}$ or $T_{max}$) by a $\Delta T_{min}$ or $\Delta T_{max}$, so that the coil capacity can be boosted in a cooling mode or a heating mode respectively. In the cooling boost mode, generally a discharge air temperature limit $T_{min}$ may be lowered by the $\Delta T_{min}$; in a heating boost mode, generally a discharge air temperature limit $T_{min}$ may be increased by the $\Delta T_{max}$. In one embodiment, the A $T_{min}$ and $\Delta T_{max}$ are about 5° F. and about 20° F. respectively. The method 860 can be configured to change the discharge air temperature gradually toward $T_{min}-\Delta T_{min}$ or $T_{max}+\Delta T_{max}$ in the cooling boost mode or the heating boost mode respectively.

Some HVAC systems may be equipped with a variable speed compressor. A variable speed compressor can change its operation speeds to provide different compressor loads. In HVAC systems equipped with both a variable speed compressor and a variable speed discharge fan, it may be desirable to modulate fan speeds of the discharge fan according to operation speeds of the variable speed compressor. The method 200 as illustrated in FIG. 2 can also be used with a HVAC system with a variable speed compressor and a variable speed discharge fan.

Figure 9A:
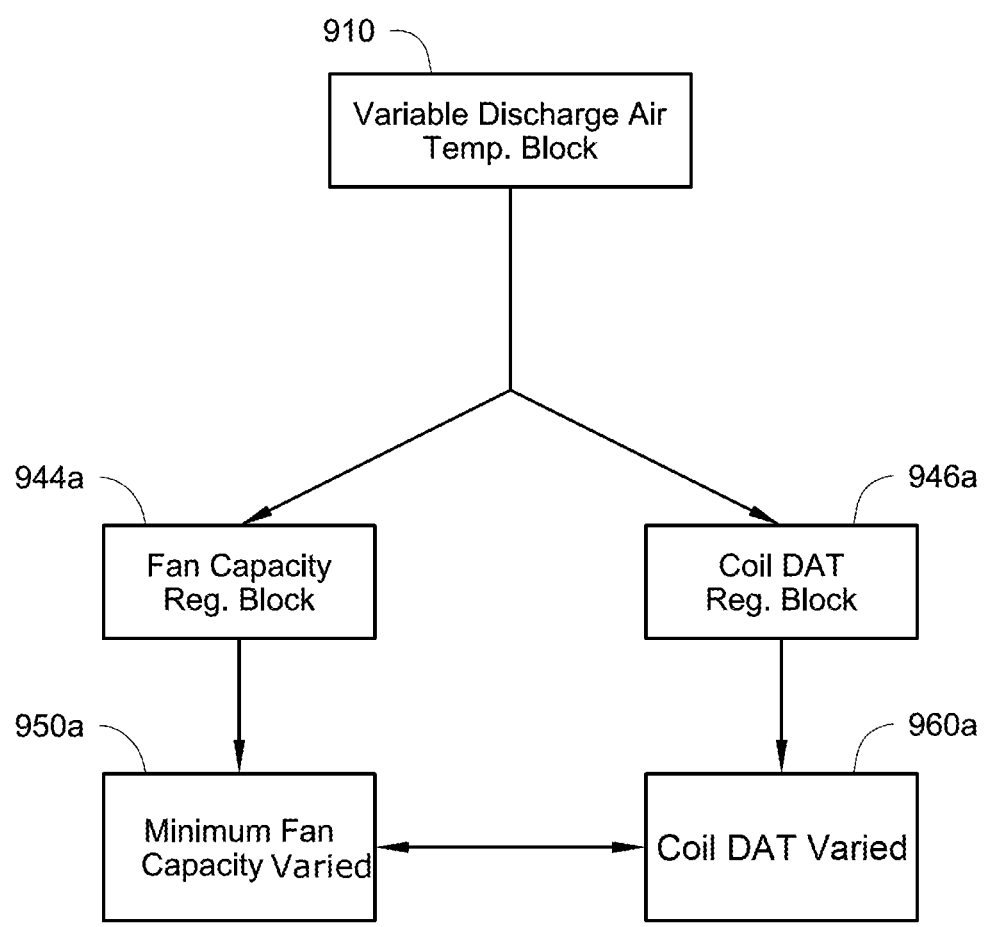
FIGS. 9A and 9B illustrate two embodiments to control a fan capacity of a discharge fan and a coil discharge air temperature in a HVAC system equipped with a variable speed compressor.
Figure 9B:
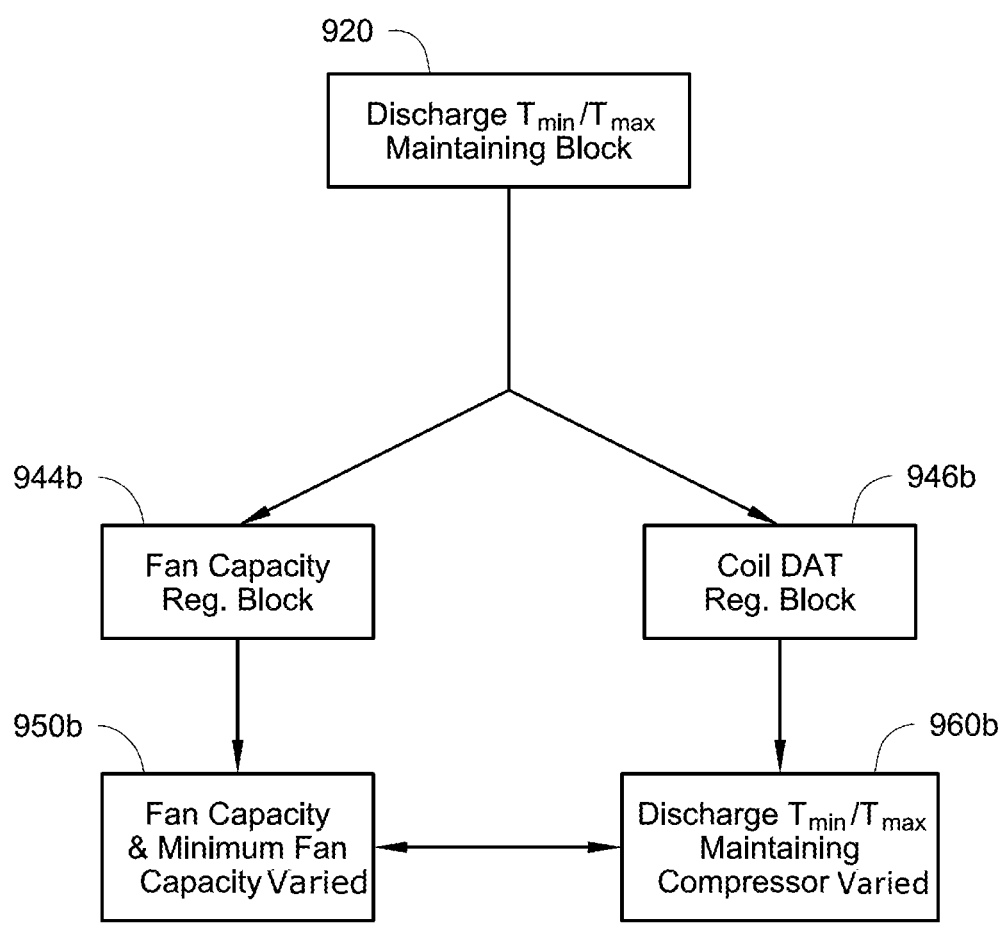

FIGS. 9A and 9B illustrate an embodiment of a variable discharge air temperature modulating block 910, and an embodiment of a discharge air temperature $T_{min}/T_{max}$ maintaining block 920 that can be used with a HVAC system equipped with both a variable speed compressor and a variable speed discharge fan.

As illustrated in FIG. 9A, the variable discharge air temperature modulating block 910 is configured to include a fan capacity regulating block 944a and a coil DAT regulating block 946a. The fan capacity regulating block 944a includes a method 950a to maintain the variable speed discharge fan at or about a minimal fan speed to meet, for example, a minimal fan capacity requirement. The coil DAT regulating block 946a includes a method 960a to regulate a coil discharge air temperature similar to the method 460 as described in FIG. 4 to, for example, maintain or modulate a space temperature. With the variable speed compressor, the method 960a can also be configured to regulate an operation speed of the variable speed compressor.

Generally, the higher the operation speed of the variable speed compressor is, the higher a coil capacity. Typically, it is desired to move more air through the coil when the compressor speed is relatively higher. Therefore, when the compressor speed varies during operation, it generally is desired to vary a minimal fan speed of the discharge fan accordingly in the method 950a.

The method 950a and the method 960a are configured to work together, so that different minimal fan capacity requirements can be determined and maintained at 950a according to the operation speed of the variable compressor speed determined at 960a.

Figure 10A:
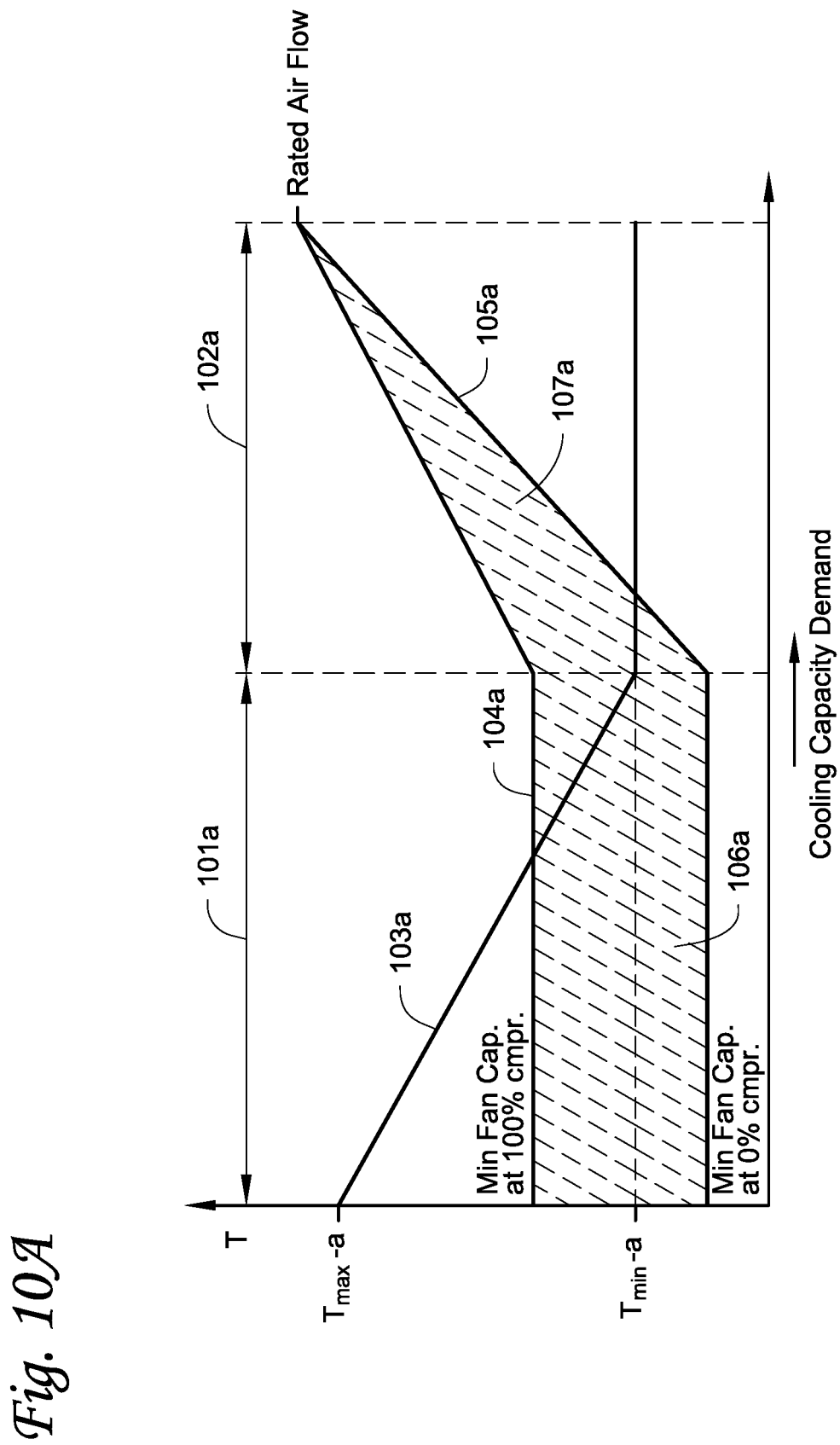
FIGS. 10A and 10B illustrate fan capacity maps that can be used with the methods as described in FIGS. 9A and 9B.
Figure 10B:
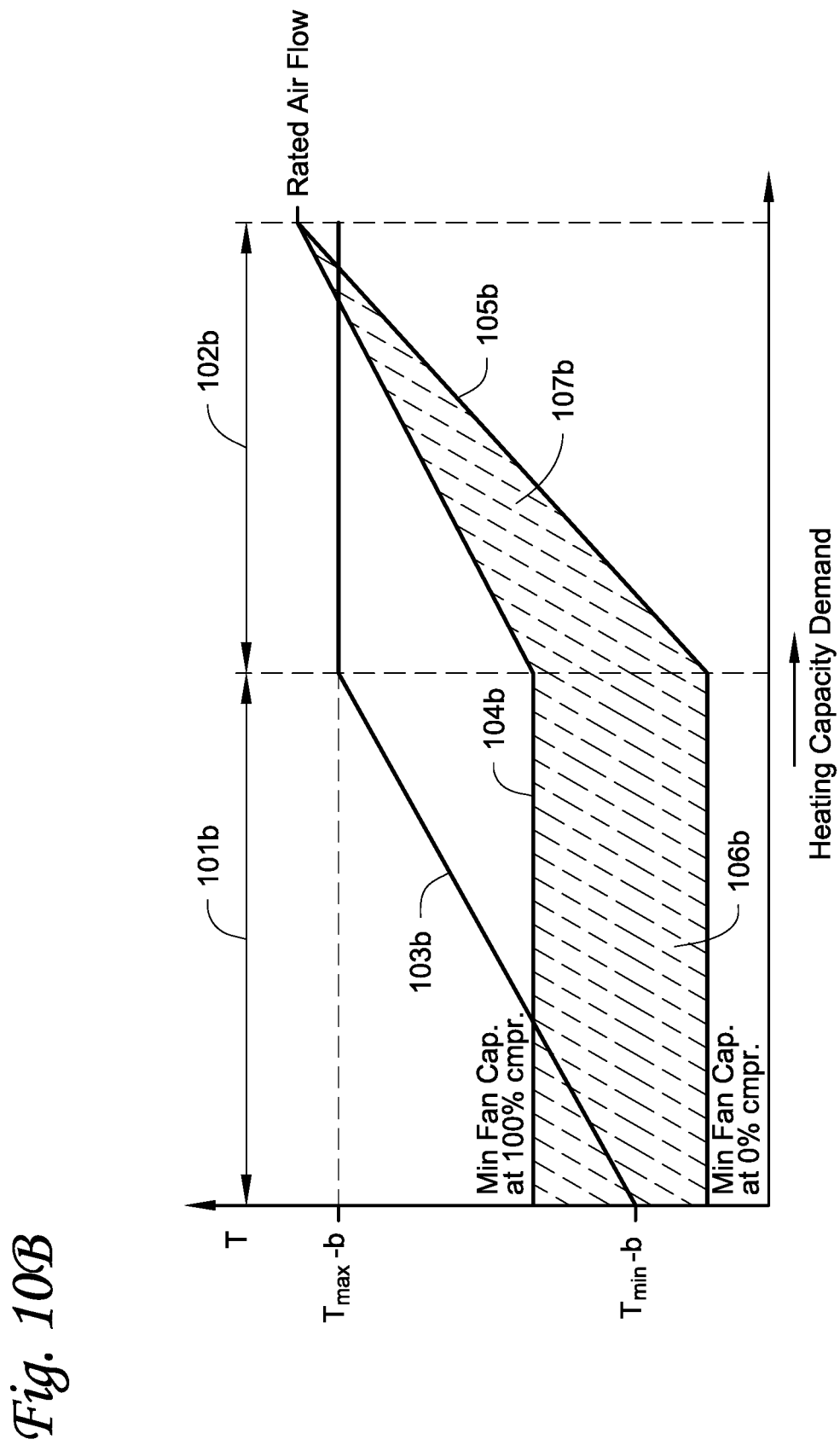

FIGS. 10A and 10B illustrate two embodiments of fan capacity maps of a variable speed discharge fan that can be used with the variable discharge air temperature modulating block 910 and the discharge air temperature $T_{min}/T_{max}$ maintaining block 920. FIG. 10A is a fan capacity map in a cooling mode and FIG. 10B is a fan capacity map in a heating mode.

In the cooling mode as illustrated in FIG. 10A, a region 101a can be used with the variable discharge air temperature modulating block 910, and a region 102a can be used with the discharge air temperature $T_{min}/T_{max}$ maintaining block 920 (see below for more details for the region 102a). Line 103a illustrates a correlation map between a cooling discharge air temperature and a cooling capacity demand. Generally, in the region 101a, the cooling discharge air temperature changes between a $T_{max}$-a and a $T_{min}$-a when the cooling capacity demand changes. Generally, the higher the cooling capacity demand is, the lower the cooling discharge air temperature. For each discharge air temperature between $T_{max}$-a to $T_{min}$-a in the region 101a, the operation speed of the variable speed compressor can vary from 0% to 100% of a compressor speed setting of the variable speed compressor (cmpr). The compressor speed setting can be a highest operation speed that the compressor is designed to be operated on. Line 104a illustrates an association map between the cooling capacity demand and the minimal fan capacity requirement (in terms of rated air flow) when the variable speed compressor works at the 100% of its compressor speed setting (100% cmpr). Line 105a illustrates an association map between the cooling capacity demand and the minimal fan capacity requirement (in terms of rated air flow) when the variable speed compressor works at the 0% of its compressor speed setting (0% cmpr). For other operation speeds of the variable speed compressor between the 0% cmpr and 100% cmpr, the minimal fan capacity requirement (and the corresponding minimal fan speed setting) can be mapped into a shaded region 106a between the lines 104a and 105a in region 101a. Based on the fan capacity map as illustrated in FIG. 10A, the minimal fan airflow requirement (and the corresponding minimal fan speed setting) can be determined according to the current operation speed of the variable compressor.

FIG. 10B illustrates a fan capacity map in a heating mode. In the heating mode as illustrated in FIG. 10B, a region 101b can be used with the variable discharge air temperature modulating block 910, and a region 102b can be used with the discharge air temperature $T_{min}/T_{max}$ maintaining block 920 (see below for more details for the region 102b). Line 103b illustrates a correlation map between a heating discharge air temperature and a heating capacity demand. Generally, in the region 101b, the heating discharge air temperature ranges between a $T_{min}$-b and a $T_{max}$-b when the heating capacity demand changes. Generally, the higher the heating capacity demand is, the higher the heating discharge air temperature.

In region 101b, line 104b illustrates an association map between the heating capacity and a fan capacity requirement including a minimal fan capacity requirement when the variable speed compressor works at or about the 100% of its compressor speed setting (100% cmpr). Line 105b illustrates an association map between the heating capacity and a minimal fan capacity requirement when the variable speed compressor works at or about its 0% of the compressor speed setting (0% cmpr). For other operation speeds of the variable speed compressor between the 0% cmpr and 100% cmpr, the minimal fan capacity requirement can be mapped into a shaded region 106b between the lines 104b and 105b.

Regions 101a and 101b in FIGS. 10A and 10B can be used with the methods 950a and 960a to help determine the minimal fan capacity requirement (or corresponding minimal fan speed setting) in the cooling mode or heating mode, while varying the coil discharge air temperature.

The region 101a (or region 101b) can be used with the method 950a and 960a, where the discharge air temperature of the coil can vary while the fan capacity is generally maintained at or about a speed that is associated to the minimal fan capacity requirement. In the region 101a (or region 101b), as illustrated by both the line 104a (or 104b) for the 100% of the compressor operation speed setting and the line 105a (or 105b) for the 0% of the compressor operation speed setting of the variable compressor speed in FIG. 10A (or FIG. 10B), the coil discharge air temperature varies between the $T_{min}$-a and $T_{max}$-a (or $T_{min}$-b and $T_{max}$-b) as the cooling (or heating) capacity varies. For a specific coil discharge air temperature, the compressor speed can vary between the 0% cmpr and 100% cmpr to maintain the specific coil discharge air temperature. As illustrated by the shaded area 106a in the cooling mode (or 106b in the heating mode), minimal fan capacity requirement can be determined, for example, based on the specific coil discharge air temperature and the compressor operation speed. The fan capacity regulation block 944a can, for example, be configured to maintain the discharge fan at or about the fan speed corresponding to the minimal fan capacity.

Referring to FIG. 9B, a discharge air temperature $T_{min}/T_{max}$ maintaining block 920 is illustrated. The discharge air temperature $T_{min}/T_{max}$ maintaining block 920 is configured to include a fan capacity regulating block 944*b* that is configured to include a method 950*b* to modulate fan speed of the variable speed discharge fan, and a coil DAT regulating block that is configured to include a method 960*b* to maintain a discharge air temperature of the coil at or about $T_{min}$ in the cooling mode or at or about $T_{max}$ in the heating mode.

When the operation speed of the variable speed compressor rises in the method 960*b*, it is generally desirable to increase a minimal fan capacity requirement in the method 950*b*; and vice versa.

Regions 102*a* and 102*b* in FIGS. 10A and 10B can be used with the methods 950*b* and 960*b* to determine the minimal fan capacity requirement (or the corresponding minimal fan speed setting) in the cooling mode and the heating mode respectively, while maintaining the coil discharge air temperature.

In the region 102*a*, as illustrated by the shaded area 107*a* between the line 104*a* for the 100% of the compressor operation speed setting and the line 105*a* for the 0% of the compressor operation speed setting of the variable compressor speed in FIG. 10A, the minimal fan capacity requirement increases when the cooling capacity demand increases. Accordingly, the minimal fan capacity requirement (or a corresponding minimal fan speed setting) in the method 950*b* in the cooling mode can be mapped to the shaded area 107*a* between the lines 104*a* and 105*a* according to the current variable compressor operation speed relative to the 100% of the compressor operation speed setting. The method 950*b*, accordingly, is configured to modulate the variable speed discharge fan between a high fan capacity setting of the variable speed discharge fan (or the corresponding high fan speed setting) and the minimal fan capacity requirement determined based on FIG. 10A (or the corresponding minimal fan speed setting). The high fan capacity setting (or the corresponding high fan speed setting) is generally fan capacity when the variable speed discharge fan is operated at or about a high speed setting.

In the heating mode as illustrated in the region 102*b* of FIG. 10B, the method 950*b* can also determine the minimal fan capacity requirement (or corresponding minimal fan speed setting) according to the current variable speed compressor operation speed relative to the 100% of the compressor operation speed setting and the heating capacity demand. The method 950*b* can control the fan capacity (or the fan speed setting) between the minimal fan capacity requirement (or the corresponding minimal fan speed setting) determined (as illustrated by the shaded region 107*b*) and the high fan capacity setting (or the corresponding high fan speed setting).

It is to be noted that the fan capacity maps as illustrated in FIG. 10A and FIG. 10B can also be adapted to control a multiple speed discharge fan by modulating a percentage of time that the discharge fan operates in a particular speed.

Generally, the $T_{min}$ and the $T_{max}$ as illustrated in FIG. 2 can be fixed numbers. For example, in one embodiment, the $T_{min}$ is about 50° F. and the $T_{max}$ is about 104° F. In some embodiments, the numbers are determined based on a designed limit, a capacity limit, a comfort limit of occupancy in the space, and/or safe operation limits.

It is to be noted that the $T_{min}$ and the $T_{max}$ do not have to be fixed numbers in some embodiments. In some embodiments, the $T_{min}$ and the $T_{max}$ can be calculated based on a space temperature setpoint for a space (such as the space 112 in FIG. 1) and a ratio of the airflow when the fan is operated at or about the high speed setting to the airflow of the discharge fan when the discharge fan is operated at or about the low speed setting (CFM ratio).

When PI control is used to maintain the space temperature of the space while maintaining the discharge air temperature of the coil, the low and high discharge air temperature limits in the PI control ($T_{low\text{-}Limit}$ and $T_{high\text{-}Limit}$) of the coil can be calculated. In one embodiment, calculated $T_{low\text{-}Limit}$=(the temperature setpoint for the space)−(CFM ratio)*(the temperature setpoint for the space−designed coil low discharge air temperature). In one embodiment, calculated $T_{high\text{-}Limit}$= (the temperature setpoint for the space)+(CFM ratio)*(the designed coil high discharge air temperature−the temperature setpoint for the space). The designed low coil discharge air temperatures can be provided, for example, by a manufacturer for a specific cooling/heating coil configuration. For example, in some embodiments, the low and high coil discharge air temperature limits are the coil temperatures when the coil reaches a capacity approximately equal to airflow ratio of minimum airflow to design airflow in the cooling mode and the heating mode respectively. Calculating the discharge air temperature $T_{low\text{-}Limit}$ and $T_{high\text{-}Limit}$ based on the ratio of the high airflow to the low airflow can help ensure that that the variable discharge air temperature control region and the variable fan control region have the same dynamic performance in space temperature control.

In some embodiments, such as in a heating VAV unit where a heating coil or electric heat section with an airflow damper is used, the method can also be adapted to control heating capacity and the airflow damper. In some embodiments, the calculated $T_{max}$ can be used as the high discharge air temperature limit in the heating mode.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A method for controlling a heating, ventilation, and air conditioning ("HVAC") system, the HVAC system including a compressor, the method comprising:
   determining, with a controller, a low fan capacity setting based on an operation of the compressor;
   maintaining a discharge fan capacity at the low fan capacity setting; and
   varying a coil discharge air temperature between a low discharge air temperature limit and a high discharge air temperature limit;
   when the coil discharge air temperature reaches the low discharge air temperature limit, varying the discharge fan capacity between the low fan capacity setting and a high fan capacity setting so as to maintain a space temperature at a space temperature setpoint, while maintaining the coil discharge air temperature at the low discharge air temperature limit.

2. The method of claim 1, further comprising:
   when the coil discharge air temperature reaches the low discharge air temperature limit and the discharge fan capacity reaches the high fan capacity setting, varying the coil discharge air temperature between the low discharge air temperature limit and a boost low discharge air temperature limit that is lower than the low discharge air temperature limit.

3. The method of claim 1, further comprising:
when the coil discharge air temperature reaches the high discharge air temperature limit, varying the discharge fan capacity between the low fan capacity setting and the high fan capacity setting so as to maintain the space temperature at the space temperature setpoint while maintaining the coil discharge air temperature at the high discharge air temperature limit.

4. The method of claim 1, further comprising:
when the coil discharge air temperature reaches the high discharge air temperature limit and the discharge fan capacity reaches the high fan capacity setting, varying the coil discharge air temperature between the high discharge air temperature limit and a boost high discharge air temperature limit that is higher than the high discharge air temperature limit.

5. The method of claim 1, wherein the HVAC system uses a two-speed discharge fan with a low speed setting and a high speed setting, and
wherein the varying the discharge fan capacity between the low fan capacity setting and the high fan capacity setting includes varying a percentage of time to operate the two-speed discharge fan at the high speed setting.

6. The method of claim 1, wherein the HVAC system uses a variable speed discharge fan with a variable speed between a low speed setting and a high speed setting, and
wherein the varying the discharge fan capacity between the low fan capacity setting and the high fan capacity setting includes varying a discharge fan speed of the variable speed discharge fan between the low speed setting and the high speed setting.

7. The method of claim 1, wherein the HVAC system uses a three-speed discharge fan with a high speed setting, an intermediate speed setting, and a low speed setting, and
wherein the varying the discharge fan capacity of the three-speed discharge fan between the low fan capacity setting and the high fan capacity setting includes:
when the discharge fan capacity required to maintain the space temperature at the space temperature setpoint is lower than an intermediate fan capacity setting, varying a discharge fan speed of the three-speed discharge fan between the low speed setting and the intermediate speed setting, and
when the discharge fan capacity required to maintain the space temperature at the space temperature setpoint is higher than the intermediate fan capacity setting, varying the discharge fan speed of the three-speed discharge fan between the intermediate speed setting and the high speed setting.

8. The method of claim 1, further comprising:
varying an airflow capacity between a minimum airflow setpoint and a maximum airflow setpoint,
wherein the step of varying the airflow capacity between the minimum airflow setpoint and the maximum airflow setpoint includes varying an opening of an airflow damper.

9. The method of claim 1, wherein the compressor is a variable speed compressor and the operation of the compressor includes a speed of the variable speed compressor.

10. A heating, ventilation, and air conditioning (HVAC) system, comprising:
a fan configured to provide a variable fan capacity between a high fan capacity setting and a low fan capacity setting;
a compressor;
a coil configured to provide a variable discharge air temperature between a high discharge air temperature limit and a low discharge air temperature limit; and
a controller configured to control the variable fan capacity of the fan and the variable discharge air temperature of the coil so as to maintain a space temperature at a space temperature setpoint;
wherein the controller is configured to determine the low fan capacity setting based on an operation of the compressor,
wherein the controller is configured to, when the variable discharge air temperature reaches the low discharge air temperature limit, vary the variable fan capacity between the low fan capacity setting and the high fan capacity setting to maintain the space temperature at the space temperature setpoint while maintaining the variable discharge air temperature at the low discharge air temperature limit.

11. The HVAC system of claim 10, wherein the controller is configured to, when the variable discharge air temperature reaches the low discharge air temperature limit and the variable fan capacity reaches the high fan capacity setting, vary the variable discharge air temperature between the low discharge air temperature limit and a boost low discharge air temperature limit that is lower than the low discharge air temperature limit.

12. The HVAC system of claim 10, wherein the controller is configured to, when the variable discharge air temperature reaches the high discharge air temperature limit, vary the variable fan capacity between the low fan capacity setting and the high fan capacity setting to maintain the space temperature at the space temperature setpoint while maintaining the variable discharge air temperature at the high discharge air temperature limit.

13. The HVAC system of claim 10, wherein the controller is configured to, when the variable discharge air temperature reaches the high discharge air temperature limit and the variable fan capacity reaches the high fan capacity setting, the controller is configured to vary the variable discharge air temperature between the high discharge air temperature limit and a boost high discharge air temperature limit that is higher than the high discharge air temperature limit.

14. The HVAC system of claim 10, wherein the fan is a two-speed discharge fan with a low speed setting and a high speed setting, and
wherein the controller configured to vary the variable fan capacity between the low fan capacity setting and the high fan capacity setting includes the controller configured to vary a percentage of time to operate the two-speed discharge fan at the high speed setting.

15. The HVAC system of claim 10, wherein the fan is a variable speed discharge fan with a variable speed between a low speed setting and a high speed setting, and
wherein the controller configured to vary the variable fan capacity between the low fan capacity setting and the high fan capacity setting includes the controller configured to vary a discharge fan speed of the variable speed discharge fan between the low speed setting and the high speed setting.

16. The HVAC system of claim 10, wherein the fan is a three-speed discharge fan with a high speed setting, an intermediate speed setting, and a low speed setting, and
wherein the controller configured to vary the variable fan capacity of the three-speed discharge fan between the low fan capacity setting and the high fan capacity setting includes:

the controller being configured to, when the variable fan capacity required to maintain the space temperature at the space temperature setpoint is lower than an intermediate fan capacity setting, vary a discharge fan speed of the three-speed discharge fan between the low speed setting and the intermediate speed setting, and the controller being configured to, when the variable fan capacity required to maintain the space temperature at the space temperature setpoint is higher than the intermediate fan capacity setting, vary the discharge fan speed of the three-speed discharge fan between the intermediate speed setting and the high speed setting.

17. The HVAC system of claim 10, wherein the controller is further configured to vary an airflow capacity between a minimum airflow setpoint and a maximum airflow setpoint,
wherein the controller configured to vary the airflow capacity between the minimum airflow setpoint and the maximum airflow setpoint includes the controller being configured to vary an opening of an airflow damper.

18. The HVAC system of claim 10, wherein the compressor is a variable speed compressor and the operation of the compressor includes controlling a speed of the variable speed compressor.

* * * * *